United States Patent

Hunter et al.

[11] Patent Number: 5,529,410
[45] Date of Patent: Jun. 25, 1996

[54] METHOD AND APPARATUS FOR CONTROLLING TENSION ON A SHEET MATERIAL IN A REEL-TO-REEL TRANSPORT SYSTEM

[75] Inventors: Kevin D. Hunter, Stratford; Walter J. Kulpa, Trumbull, both of Conn.

[73] Assignee: Pitney Bowes Inc., Stamford, Conn.

[21] Appl. No.: 331,303

[22] Filed: Oct. 28, 1994

[51] Int. Cl.$^6$ .................................................. B41J 33/52
[52] U.S. Cl. ...................... 400/234; 400/236; 400/249; 242/334; 242/412.3; 242/413.2
[58] Field of Search ...................... 400/225, 234, 400/236, 236.1, 247, 249; 242/333.6, 334, 334.1, 334.4, 334.5, 334.6, 412.2, 412.3, 413, 413.4, 412.1, 413.1, 413.2, 413.3

[56] References Cited

U.S. PATENT DOCUMENTS

| | | | |
|---|---|---|---|
| 4,448,366 | 5/1984 | Fludzinski | 242/412.2 |
| 4,513,229 | 4/1985 | Kudelski | 242/334.6 |
| 4,788,558 | 11/1988 | Caldwell et al. | 346/76 PH |
| 4,949,761 | 11/1990 | Gibson-Saxty | 400/225 |
| 4,977,466 | 12/1990 | Nakata | 242/412.3 |
| 5,267,401 | 12/1993 | Freeman et al. | 33/733 |
| 5,300,953 | 4/1994 | Schulte | 400/234 |
| 5,330,118 | 7/1994 | Yoshikawa | 242/334.5 |
| 5,367,471 | 11/1994 | Nguyen et al. | 242/413 |

*Primary Examiner*—David A. Wiecking
*Attorney, Agent, or Firm*—Angelo N. Chaclas; Charles G. Parks, Jr.; Melvin J. Scolnick

[57] ABSTRACT

A method and apparatus for controlling tension on a sheet material in a reel-to-reel transport system. The sheet material is feed along a defined path from a supply reel to a take-up reel. A motor is operatively connected to the take-up reel for applying a torque to the take-up reel while a sensor is positioned to detect rotation of the supply reel. A microcontroller enables the motor with an initial PWM $pwm_o$ to create torque on the take-up reel and then incrementally increases the PWM. When the sensor indicates that the supply reel has moved, the current PWM is stored in memory as $pwm_i$. This $pwm_i$ is subsequently used by the apparatus to determine a desired tension on the thermal ribbon.

67 Claims, 10 Drawing Sheets

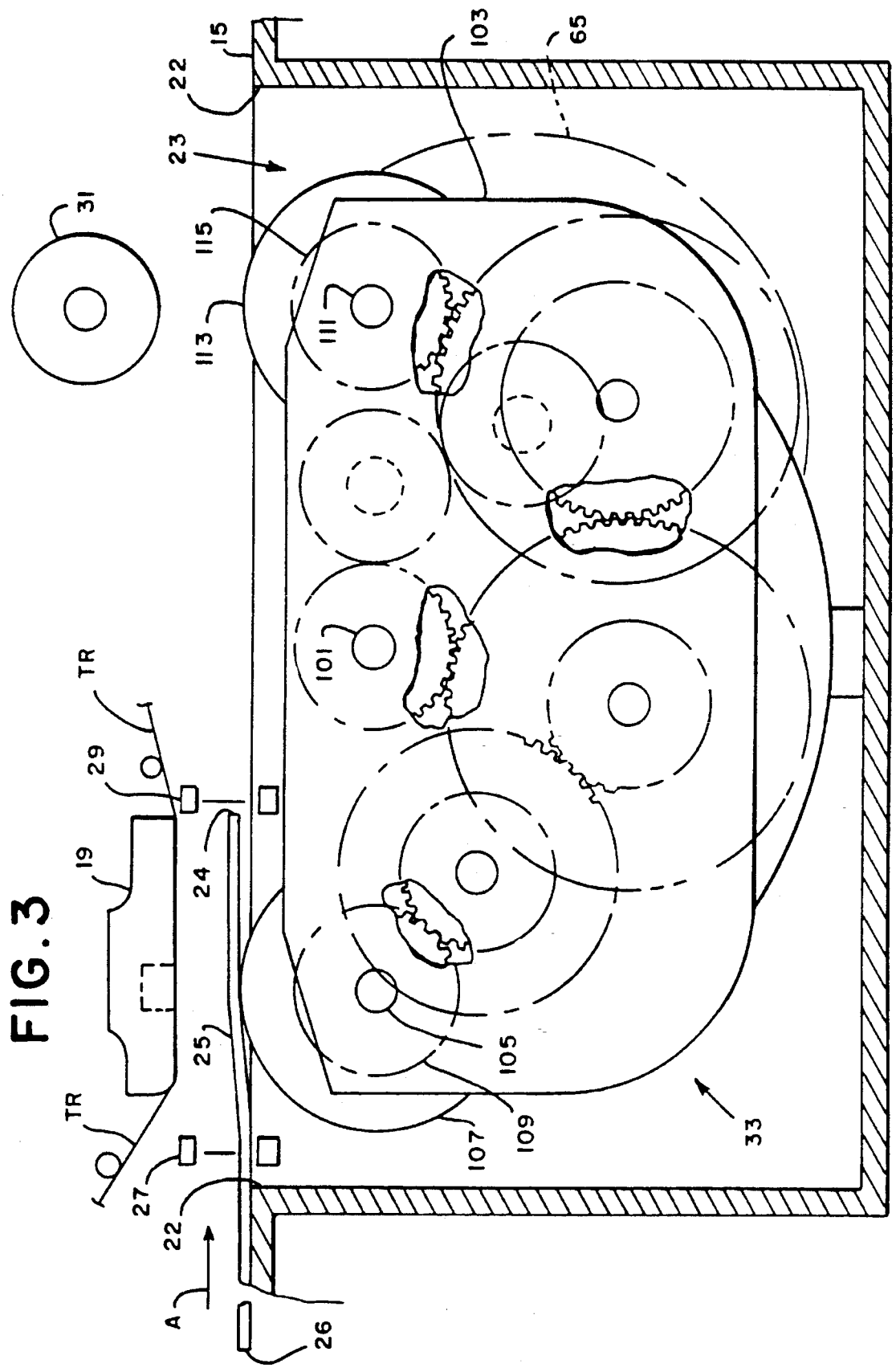

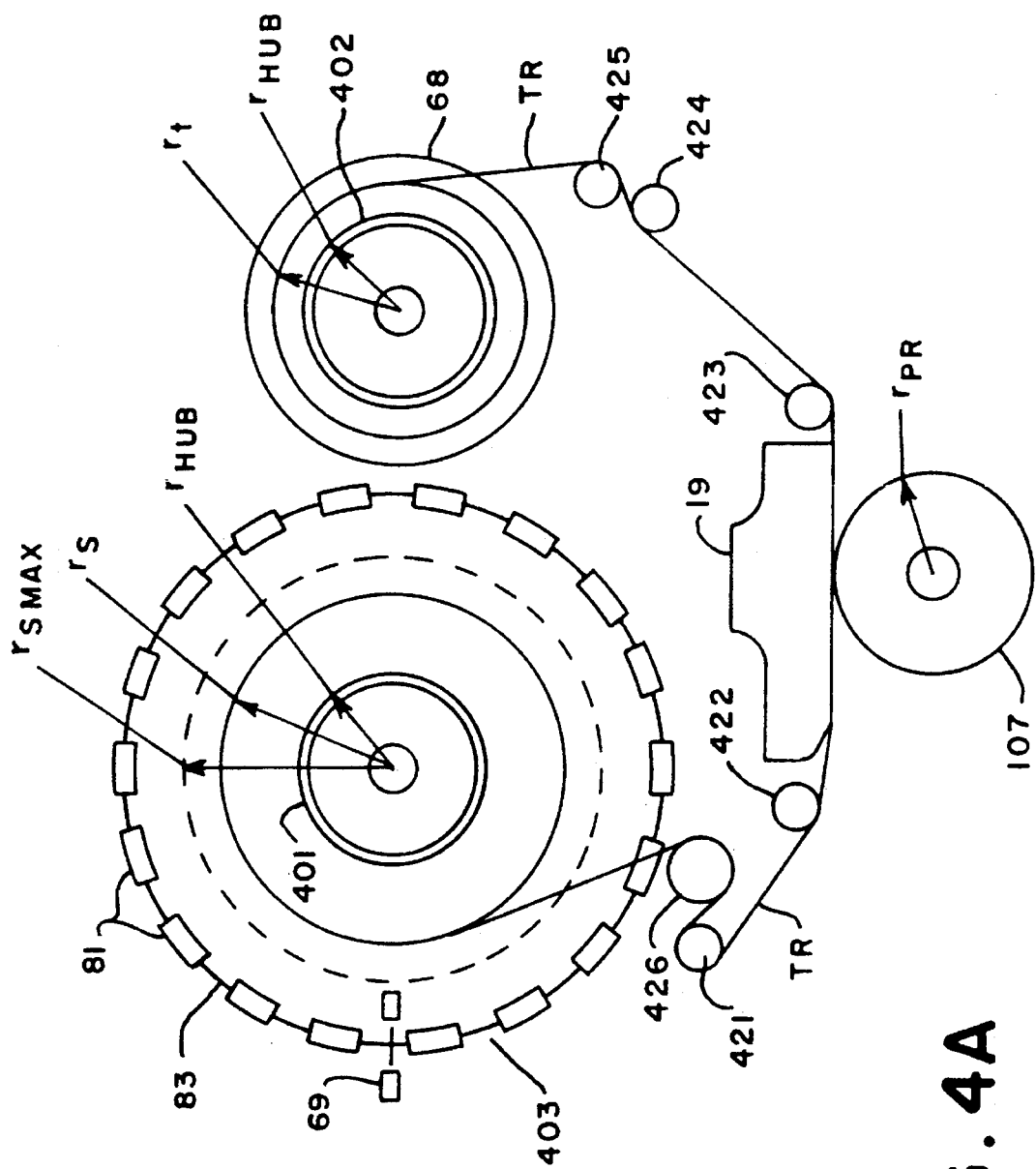

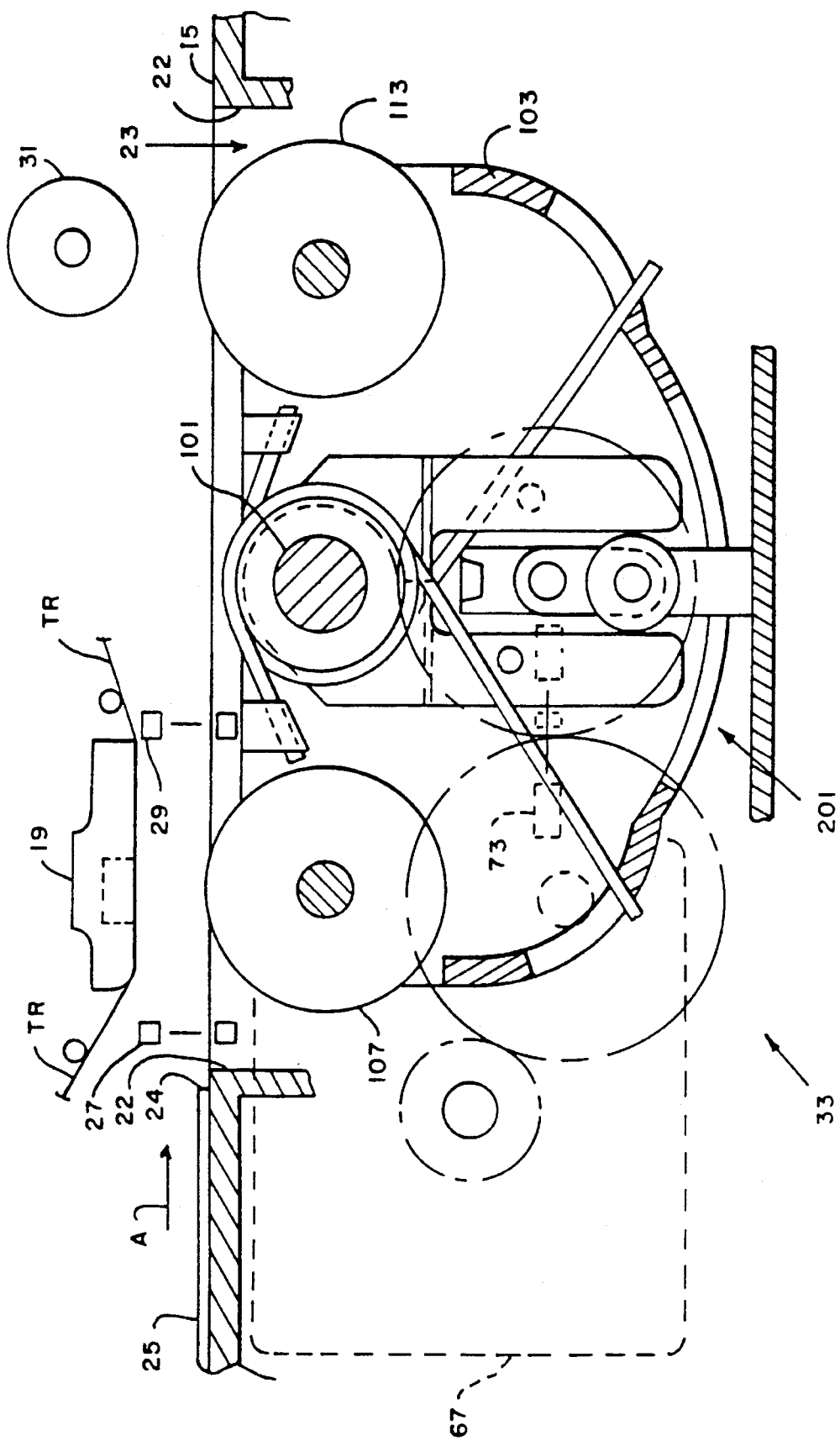

METHOD AND APPARATUS FOR CONTROLLING TENSION ON A SHEET MATERIAL IN A REEL-TO-REEL TRANSPORT SYSTEM

FIELD OF THE INVENTION

This invention relates to reel-to-reel sheet material transport systems where the sheet material is originally wound on a supply reel and passes through a workstation before being collected on a take-up reel. The workstation defines a location where a desired operation is performed on the sheet material, such as: printing, reading, writing, etc. The sheet material may be of any desired composition so long as it is suitably thin and flexible. More particularly, this invention is directed to controlling the tension on a thermal ribbon along a feed path in a thermal transfer printer.

BACKGROUND OF THE INVENTION

A typical thermal transfer printer includes a supply of thermal ribbon which contains a backing layer and an ink (pigment, resin, wax, etc.) coating layer. The thermal ribbon is unwound from a supply reel and fed along a defined path such that the backing layer of the thermal ribbon comes into contact with a thermal print head where printing occurs. Opposite the thermal print head is a print roller. The gap between the thermal print head and the print roller defines a workstation where printing occurs. After passing by the thermal print head, the used thermal ribbon is collected on a take-up reel. Typically, the thermal ribbon, supply reel and take-up reel are located in a cassette which is detachably mounted to the thermal printer. Thus making it easy to insert a new cassette when the supply of thermal ribbon has been exhausted.

A combination of pressure and heat is necessary to produce a desired pattern on an article (paper, film, tape, etc.). A print or platen roller compresses the article against the thermal print head with the thermal ribbon captured therebetween such that the ink coating layer is in contact with the article. As the print roller rotates it causes the article to advance past the thermal print head. Because of compressive force and friction between the article and the thermal ribbon, the article drags the thermal ribbon along with it as it feeds past the thermal print head. Thus the article and the thermal ribbon move synchronously past the thermal print head with the thermal ribbon unwinding from the supply reel as necessary. As the article and the thermal ribbon feed past the thermal print head, a microcontroller selectively energizes individual heating elements of the thermal print head which cause the ink to liquefy. Because of the compressive force and greater attraction of the liquid ink to the article than to the thermal ribbon backing layer, the liquid ink transfers to the article where it cools and resolidifies. Depending on the timing and sequence of energizing the heating elements, any desired pattern (alphanumeric, barcode, postal indicia, etc.) can be transferred to the article. After printing, the used thermal ribbon is collected on the take-up reel.

In a thermal printer it is important to control the tension on the thermal ribbon between the thermal print head and the take-up reel. Once the ink transfers to the article and resolidifies, the thermal ribbon has a tendency to cling to the article. Therefore, it is necessary to peel the thermal ribbon from the just printed article. In extreme cases, too much tension will cause the thermal ribbon to deform, stretch or even break. On the other hand, too little tension also causes problems. During printing the thermal ribbon typically becomes wrinkled. Therefore, to ensure that the used thermal ribbon is neatly collected on the take-up reel adequate tension is necessary. Additionally, tension on the thermal ribbon between the thermal print head and the take-up reel also assists the print roller in feeding the article past the thermal print head. Thus, it is advantageous to control the tension on the thermal ribbon.

Additionally, some other factors that influence the tension requirements are: printing speed, type of ink being used, type of thermal ribbon being used, type of article being printed on, ambient environmental conditions and manufacturing tolerances.

Typical tension control systems seek to control the tension by applying a constant torque to the take-up reel. However, for a given torque applied to the-take-up reel, the resulting tension on the thermal ribbon, or other sheet material, is inversely proportional to the radius of the take-up reel as governed by the equation:

$$\text{tension} = \text{torque/take-up reel radius.}$$

In such systems, since the radius of the take-up reel increases as thermal ribbon is collected, the resulting tension on the thermal ribbon decreases. Therefore, a constant torque does not result in a constant tension.

Other tension control systems seek to achieve a constant tension by applying a variable torque to the take-up reel depending on the radius of the take-up reel. Therefore, the diameter of the take-up reel must be determined. Prior art mechanical approaches use spring loaded followers that are biased against the ribbon on the take-up reel where the position of the follower has a known relationship to the radius of the take-up reel. As a result, the changing radius of the take-up reel causes the follower to deflect to a new position from which the radius of the take-up reel can be ascertained. However, these mechanical approaches suffer from reliability and accuracy problems. Another problem is that they create drag on the take-up reel.

Still other approaches to determining the take-up reel radius utilize a known relationship between movement of the ribbon and either: (1) the angular rotation of the take-up reel over a given time period, or (2) the angular velocity of the take-up reel. Since both approaches are dependent on time, they must include apparatus to accurately measure elapsed time. Additionally, these approaches involve sophisticated measuring and feedback systems which add greatly to the overall cost of the product into which they are incorporated. Therefore, there is a need to control tension on a sheet material by techniques that are not dependent on time.

SUMMARY OF THE INVENTION

Accordingly, it is an object of the present invention to provide tension control in a reel-to-reel sheet material transport system.

It is another object of the present invention to provide tension control in a reel-to-reel sheet material transport system that substantially compensates for all the factors which may influence tension requirements.

It is yet another object of the present invention to provide tension control in a reel-to-reel sheet material transport system that substantially compensates for changes in the operating conditions influencing torque requirements.

It is a further object of the present invention to determine the take-up reel radius by calculating the supply reel radius.

It is still a further object of the present invention to calculate the supply reel radius without relying on angular velocity measurements or time intervals.

It is yet another object of the present invention to provide substantially uniform tension on the thermal ribbon over the entire life of the ribbon cassette.

In accomplishing these and other objects there is provided a method and apparatus for controlling tension on a sheet material in a transport system.

The apparatus includes a take-up reel which is coupled to a take-up reel motor through a series of interconnecting gears. When the take-up reel motor is enabled with a pulse width modulated voltage (PWM) to apply a torque to the take-up reel motor shaft, a corresponding torque results on the take-up reel. By regulating the PWM of the take-up reel motor, the torque on the take-up reel and resulting tension on the thermal ribbon can be accurately controlled. The applied PWM pwm is determined from the sum of two components, $pwm_i$ and $pwm_j$, respectively, to apply or create a desired tension on the thermal ribbon.

The first component, $pwm_i$, is a PWM measured during an Initialization procedure. With the print roller spaced apart from the thermal print head so that movement of the thermal ribbon is not restricted, the take-up reel motor is enabled with an initial PWM $pmw_o$ to produce a small torque on the take-up reel. Thereafter, the PWM is increased in small increments until a sensor detects that the thermal ribbon has moved. The value of the PWM when movement first occurs is stored as $pmw_i$.

The second component, $pwm_j$, is a PWM calculated during a Jog Profile procedure. This PWM depends on the radius of the take-up reel and a selected ribbon tension. Unlike in the Initialization procedure, here the print roller is brought into contact with the thermal print head so that the rotation of the supply reel, take-up reel and print roller are all correlated with the feeding of the thermal ribbon. These relationships are governed by known geometric principles. The radius of the take-up reel is inferred from the radius of the supply reel since they have a known relationship. The radius of the supply reel is determined by counting the number of drive motors steps that correspond to a known angular rotation of the supply reel and utilizing the known radius of the print roller. From the calculated supply reel radius a corresponding take-up reel radius is obtained from a radius conversion look-up table stored in memory. Using the take-up reel radius thusly obtained, the selected thermal ribbon tension and known PWM-to-torque characteristics of the take-up reel motor; the PWM necessary to achieve the selected tension, $pwm_j$, is determined.

Because the radius of the take-up reel changes rather slowly, it is not necessary to recalculate $pwm_j$ after each print cycle or operation. However, doing so has the advantage of quickly compensating for a change in the ribbon cassette.

With $pwm_i$ and $pwm_j$ now known, the applied PWM pwm is determined from the sum of these two components.

Therefore, it is now apparent that the invention achieves all the above objects and advantages. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a partial sectioned front view of the drive assembly in the home position in accordance with the present invention.

FIG. 4A is a schematic of a thermal ribbon system including a sensor assembly associated with a supply reel and print system in accordance with the present invention.

FIG. 5A is a sectioned front view of the drive assembly and a crank assembly in the home position in accordance with the present invention.

DETAILED DESCRIPTION OF THE PREFERRED EMBODIMENT

While the disclosed method and apparatus for controlling tension on a sheet material in a reel-to-reel transport system has many applications (film and projection systems, audio cassette systems, video cassette systems, various printing systems), the description of the preferred embodiment provided below is given with respect to a thermal transfer printer. More particularly, the detailed description of the invention is as embodied in a thermal postage meter.

Figure 1:
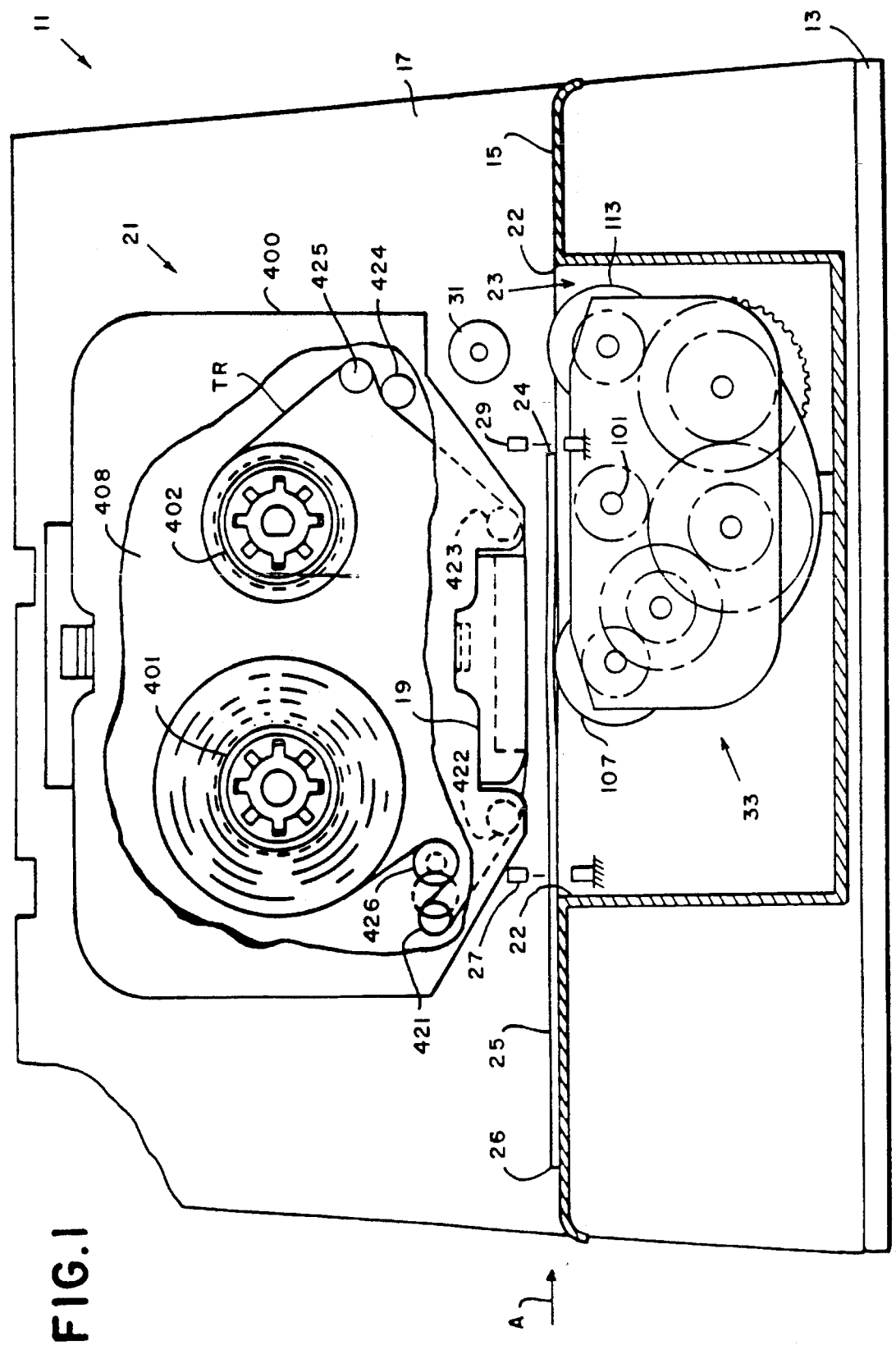
FIG. 1 is a partial sectioned and partial cut-away front view of a thermal postage meter with a thermal ribbon cassette.

Referring to FIG. 1, a thermal postage meter 11 constructed in accordance with this invention is shown. Included in the meter 11 is a base 13 and a substantially vertical registration wall 17. The registration wall 17 and the base 13 are rigid structures each providing suitable framework for mounting and supporting various other components. Fixably mounted to the registration wall 17 and the base 13 is a substantially horizontal deck 15. A thermal print head 19, a trailing edge sensor 27 and a leading edge sensor 29 are fixably mounted to the registration wall 17.

Detachably mounted to the registration wall 17 is a thermal ribbon cassette 21 containing a supply of thermal ribbon TR which has a backing layer and an ink coating layer. The thermal ribbon TR is unwound from a supply reel 401 and feed along a defined path such that the backing layer comes into contact with the thermal print head 19 before being collected on a take-up reel 402. Along the defined path, the thermal ribbon TR is threaded around a plurality of drag posts 421, 422, 423, 424, 425, 426. The drag posts 421, 422, 423, 424, 425, 426 are fixably mounted by any conventional means to a cassette rear wall 408.

Rotatively mounted to the registration wall 17 is a backing roller 31. An envelope 25 is shown positioned on the deck 15 and travels along a defined path from left to right as indicated by arrow "A." The deck 15 includes an opening 22 and deck recess 23 which are generally aligned underneath the thermal print head 19 and the backing roller 31.

A print and eject roller drive assembly 33 is generally located in the deck recess 23 such that a print roller 107 is opposite the thermal print head 19 and an eject roller 113 is opposite the backing roller 31. The axes of the print roller 107 and eject roller 113 are substantially parallel and transverse to the direction of envelope travel "A." The deck recess 23 is sufficiently large to accommodate the drive assembly 33. The nip between the print roller 107 and the thermal print head 19 is commonly referred to as a workstation where actual printing of a postal indicia on the envelope 25 occurs.

Figure 2:
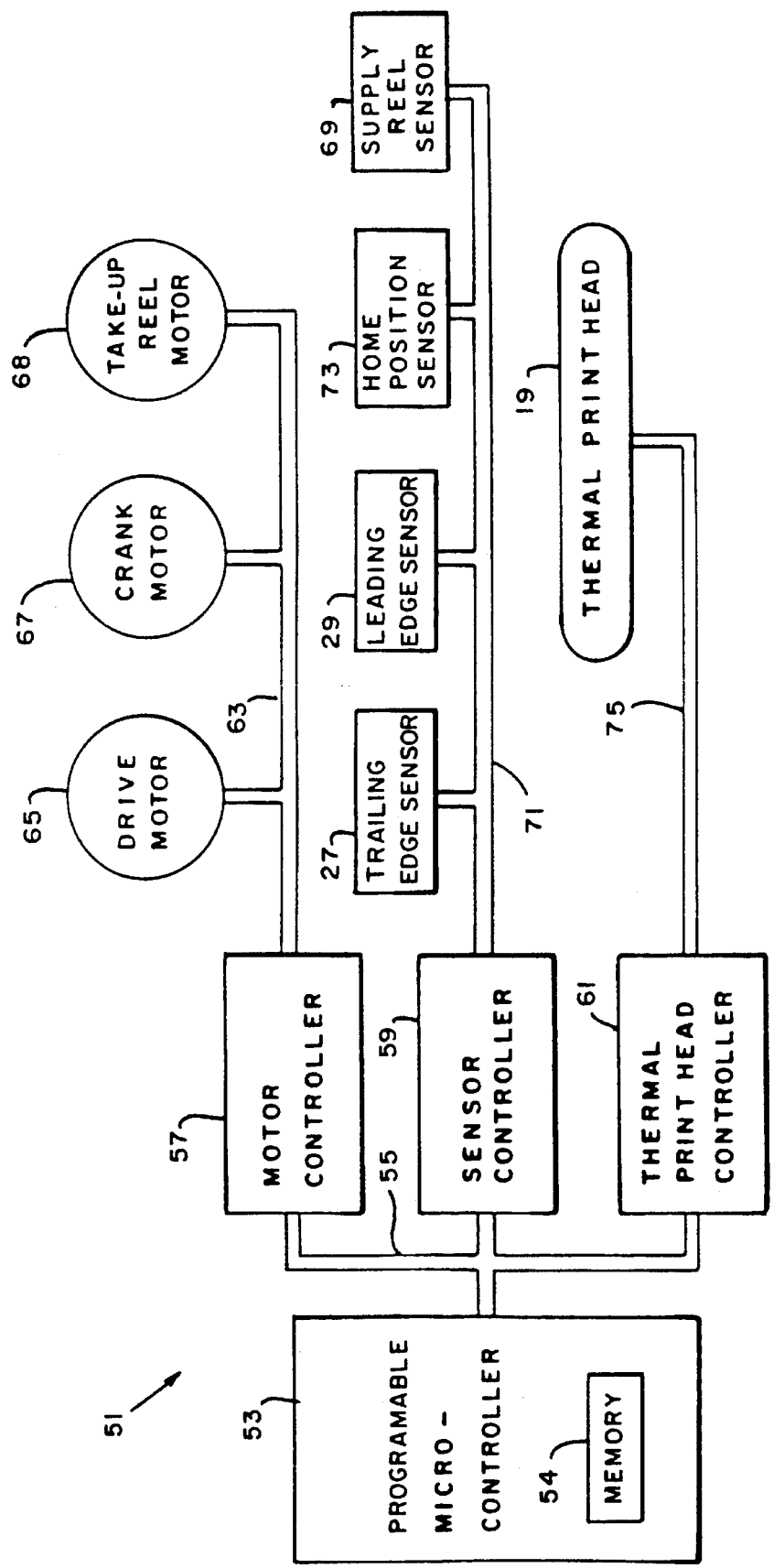
FIG. 2 is a schematic of a control system in accordance with the present invention.

Referring to FIGS. 1 and 2, the thermal postage meter 11 is under the influence of a control system 51. The control system 51 includes a programmable microcontroller 53 of any suitable conventional design, which is in bus 55 communication with: a motor controller 57, a sensor controller 59 and a thermal print head controller 61. The microcontroller 53 includes memory 54. The motor controller 57, sensor controller 59, and thermal print head controller 61 are of any suitable conventional design. The motor controller 57 is in motor bus 63 communication with: a drive motor 65, a crank motor 67 and a take-up reel motor 68. The drive motor 65 and crank motor 67 are suitably designed stepper motors. The sensor controller 59 is in sensor bus 71 communication with: the trailing edge sensor 27, the leading edge sensor 29, a home position sensor 73, and a supply reel sensor 69. The thermal print head controller 61 is in thermal print head bus 75 communication with the thermal print head 19. The trailing edge sensor 27, leading edge sensor 29, home position sensor 73 and supply reel sensor 69 are suitably designed optical sensors.

Referring to FIG. 3, the drive assembly 33 includes a drive shaft 101 which is rotatively mounted to extend between the registration wall 17 and deck recess 23. The drive shaft 101 is located below and parallel to the deck 15. Additionally, the drive shaft 101 is aligned to be transverse to the direction of envelope travel "A." Rotatively mounted to the drive shaft 101 is a drive housing 103 which is a generally U-shaped bracket with suitable framework for attaching various shafts, springs and gears. The deck recess 23 is sufficiently large and free from obstructions to allow the drive housing 103 to rotate or pivot freely about the drive shaft 101. Rotatively mounted to the drive housing 103 is a print roller shaft 105 and an eject roller shaft 111. Fixably mounted to the print roller shaft 105 is the print roller 107 and a print roller gear 109. Fixably mounted to the eject roller shaft 111 is the eject roller 113 and an eject roller gear 115. As shown in FIG. 3, the print roller 107 and the eject roller 113 are positioned symmetrically about a vertical center line passing through the center of the drive shaft 101. Additionally, the drive shaft 101, the print roller shaft 105 and the eject roller shaft 111 are substantially in horizontal alignment. It should now be apparent that drive housing 103 behaves in a seesaw like fashion pivoting about the drive shaft 101 with the print roller 107 on one end of the drive housing 103 and the eject roller 113 on the other end of the drive housing 103.

Referring to FIG. 4A, located on the rim 403 of the supply reel 401 are a series of flags 81 and gaps 83. The gaps 83 allow light to pass through while the flags 81 do not. The supply reel sensor 69 is positioned so that as the supply reel 401 rotates the flags 81 and gaps 83 alternately block and unblock, respectively, the supply reel sensor 69. Also shown are a series of dimensions including: $r_s$, $r_t$, $r_{hub}$ and $r_{smax}$; where $r_s$ is the radius of the thermal ribbon TR remaining on the supply reel 401, $r_t$ is the radius of the thermal ribbon TR collected on the take-up reel 402, $r_{hub}$ is a constant equal to the radius of the supply reel 401 hub and $r_{smax}$ is a constant equal to the maximum possible radius of the thermal ribbon TR on the supply reel 401 as defined by a brand new ribbon cassette 21.

Referring to FIGS. 2, 5A, 5B, and 5C, the function of the thermal postage meter 11 is to accept the envelope 25, print an indicia using thermal transfer print technology, and eject the envelope 25 from the meter 11. The feed direction of the meter 11 is from left to right and is indicated by arrow "A". The envelope 25 and thermal ribbon TR are pinched between the print roller 107 and the thermal print head 19. The print roller 107 supplies the thermal print head 19 sufficient backing pressure needed for transfer of ink from a thermal ribbon TR to the envelope 25 during the print cycle. Due to frictional forces, rotation of the print roller 107 causes the envelope 25 and the thermal ribbon TR to feed together at a constant rate past the thermal print head 19. The programmable microcontroller 53 is programmed to instruct the thermal print head controller 61 to actuate the heating elements of the thermal print head 19 synchronous to displacement of the envelope 25 to produce the postal indicia or other desired image. Since the print roller 107 feeds both the envelope 25 and thermal ribbon TR, use of the print roller 107 to feed the envelope 25 from the postage meter 11 would lead to wasted thermal ribbon TR. To conserve thermal ribbon TR, the eject roller 113 is used to feed the envelope 25 out of the postage meter 11 after printing.

Referring to FIG. 5A, the drive assembly 33 is in the home position. The print roller 107 and the eject roller 113 are provided for independent control of the envelope 25. The print roller 107 and eject roller 113 are mounted on opposite sides of the drive housing 103 which pivots about the drive shaft 101. When the drive assembly 33 is in the home position, the print roller 107 is spaced apart from the thermal print head 19 and the eject roller 113 is spaced apart from the backing roller 31. It should be apparent that the feed path of the thermal ribbon TR is defined so that the thermal ribbon TR contacts the thermal print head 19 but not the backing roller 31.

Figure 5B:
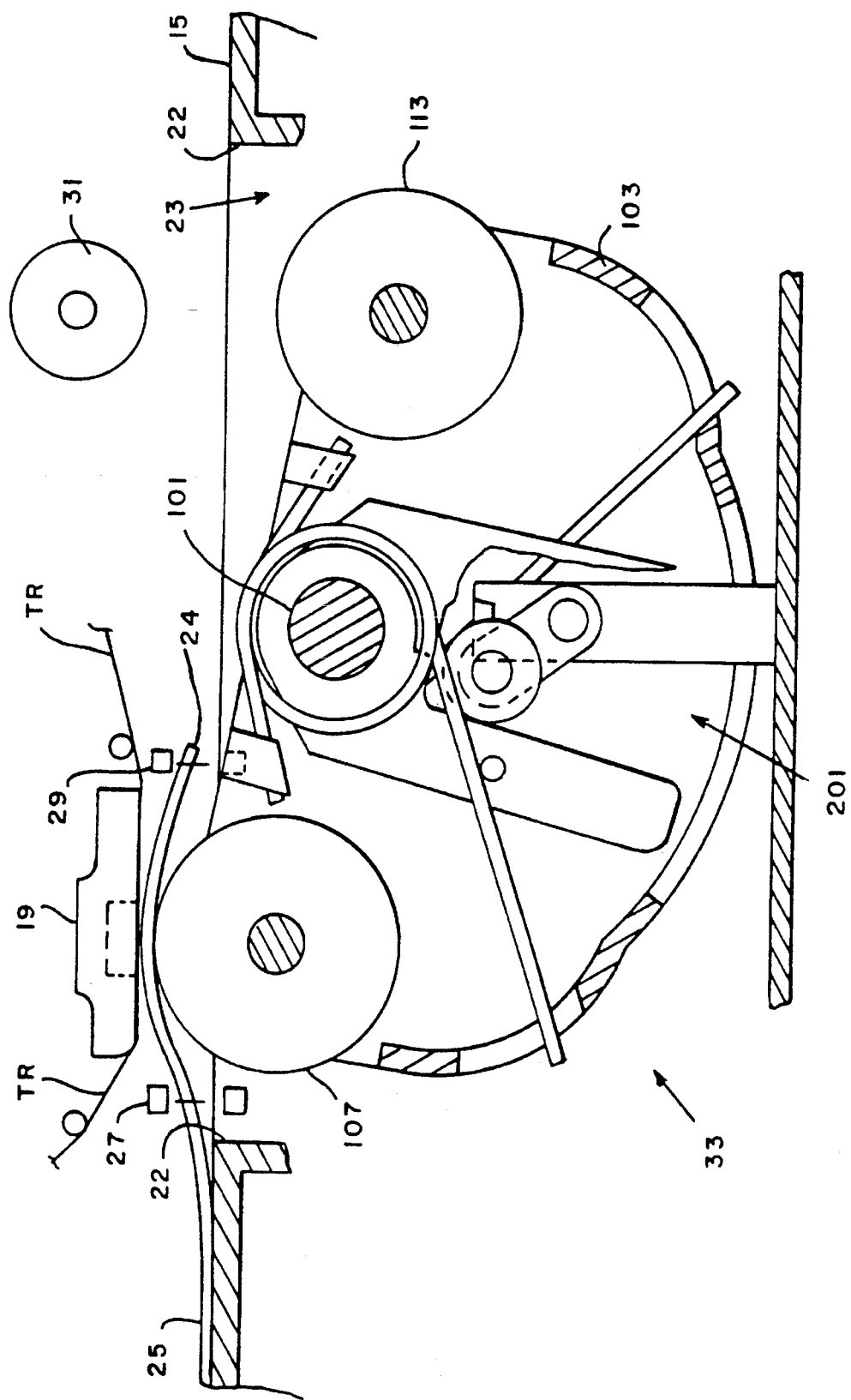
FIG. 5B is a sectioned front view of the drive assembly and a crank assembly in the print position in accordance with the present invention.

Referring to FIG. 5B, the drive assembly 33 is in the print position. If the drive housing 103 pivots about the drive shaft 101 in a clockwise direction from the home position, then the print roller 107 rotates up above the deck 15 to bring the envelope 25 in contact with the thermal ribbon TR and the thermal print head 19. It should be readily apparent that the deck 15 is provided with suitable located openings to accommodate the motion of the drive housing 103 and print roller 107.

Figure 5C:
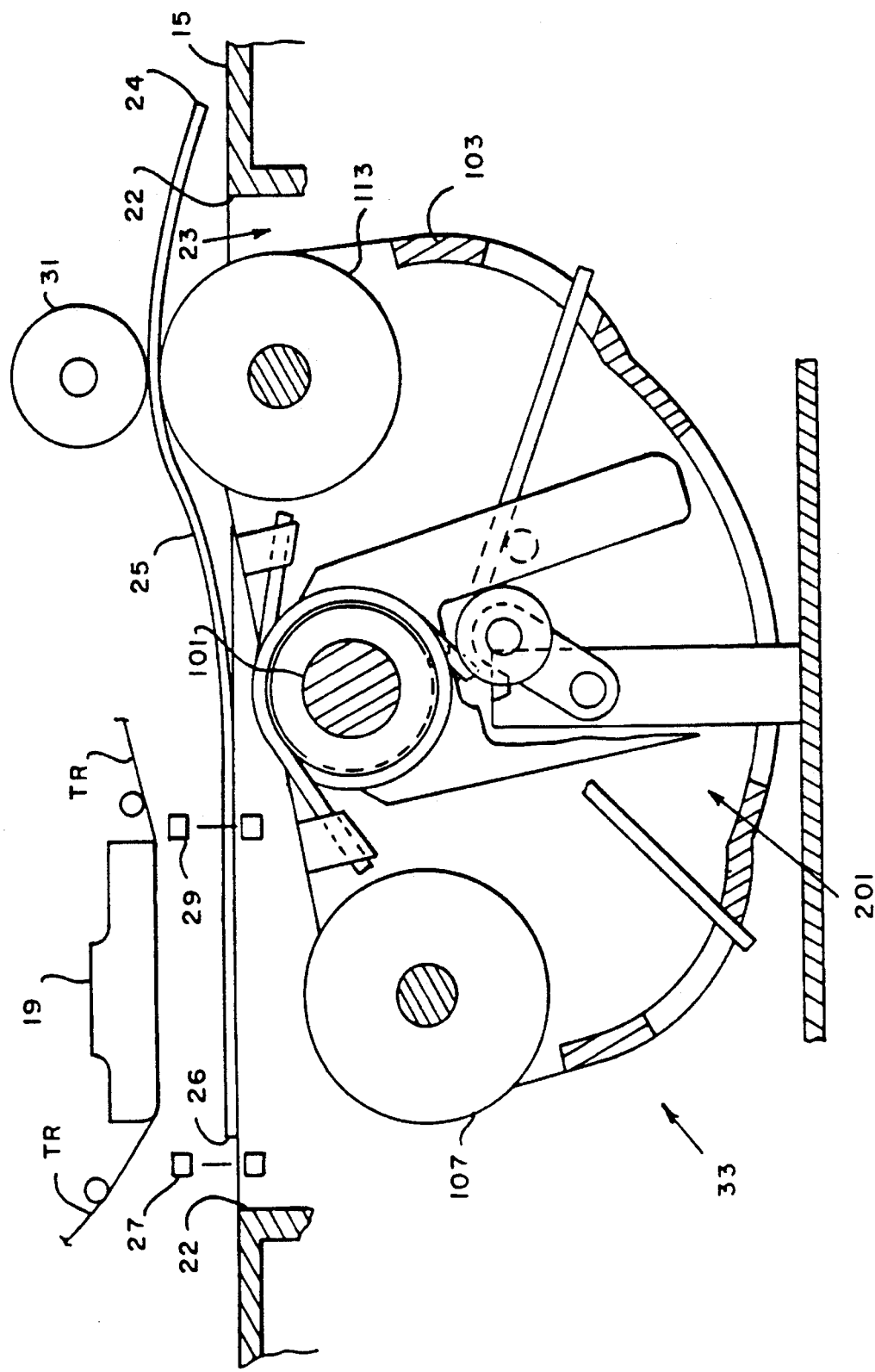
FIG. 5C is a sectioned front view of the drive assembly and a crank assembly in the eject position in accordance with the present invention.

Referring to FIG. 5C, the drive assembly 33 is in the eject position. If the drive housing 103 pivots about the drive shaft 101 in a counter clockwise direction from the home position, then the eject roller 113 rotates up above the deck 15 to bring the envelope 25 in contact with the backing roller 31. It should be readily apparent that the deck 15 is provided with suitable located openings to accommodate the motion of the drive housing 103 and eject roller 113.

Referring to FIGS. 2 and 3, the leading edge sensor 29 and the trailing edge sensor 27 are suitably positioned relative to the deck 15 so as to detect the presence of the envelope 25. The leading edge sensor 29 is positioned downstream in the direction of envelope travel "A" from the print roller 107 but upstream from the drive shaft 101. The leading edge sensor 29 indicates to the microcontroller 53 the presence of the envelope 25 when a leading edge 24 of the envelope 25 blocks the leading edge sensor 29. The trailing edge sensor 27 is positioned upstream from the print roller 107. The trailing edge sensor 27 indicates to the microcontroller 53 when a trailing edge 26 of the envelope 25 is detected.

FIGS. 5A, 5B and 5C also show a crank assembly 201 which is under the control of the microcontroller 53. The crank assembly 201 is primarily responsible from repositioning the drive housing 103 between the home, print and eject positions. A more detailed description of the drive assembly 33 and crank assembly 201 is contained in U.S. patent application Ser. No. 08/331,304 filed on Oct. 28, 1994, assigned to the assignee of the present invention and incorporated herein by reference.

The thermal postage meter 11 remains at idle with the drive assembly 33 and the crank assembly 201 in the home position until the operator advances the envelope 25 sufficiently along the deck 15 so that the leading edge 24 of envelope 25 is detected by the leading edge sensor 29. Once the leading edge 24 of the envelope 25 is detected, the programmable microcontroller 53 initiates a print cycle. During printing the take-up reel motor 68 applies a torque to the take-up reel 402 and thus creates tension on the thermal ribbon TR between the take-up reel 402 and the thermal print head 19. So that an excess of thermal ribbon TR does not unwind from the supply reel 401, a drag spring (not shown) is biased against the supply reel 401. The drag spring prevents the supply reel 401 from rotating uncontrollably as the thermal ribbon TR is pulled along by the print roller 107. In this fashion, thermal ribbon TR is unwound from the supply reel 401 and collected on the take-up reel 402 in an orderly and neat manner.

The take-up reel motor 68 is enabled with a pulse width modulated voltage (PWM) to apply a torque to the take-up reel motor shaft (not shown) which results in a corresponding torque applied to the take-up reel 402. By regulating the PWM of the motor 68, the torque and resulting tension on the take-up reel 402 can be accurately controlled. The applied PWM is determined from the sum of two components, as defined by:

$$pwm = pwm_i + pwm_j \quad (1)$$

where pwm is the applied PWM resulting in a desired tension on the thermal ribbon TR, $pwm_i$ is a PWM measured during an Initialization procedure and $pwm_j$ is a PWM determined during a Jog Profile procedure. More specifically, $pwm_j$ depends on the radius of the take-up reel 402 and a selected ribbon tension.

Figure 6:
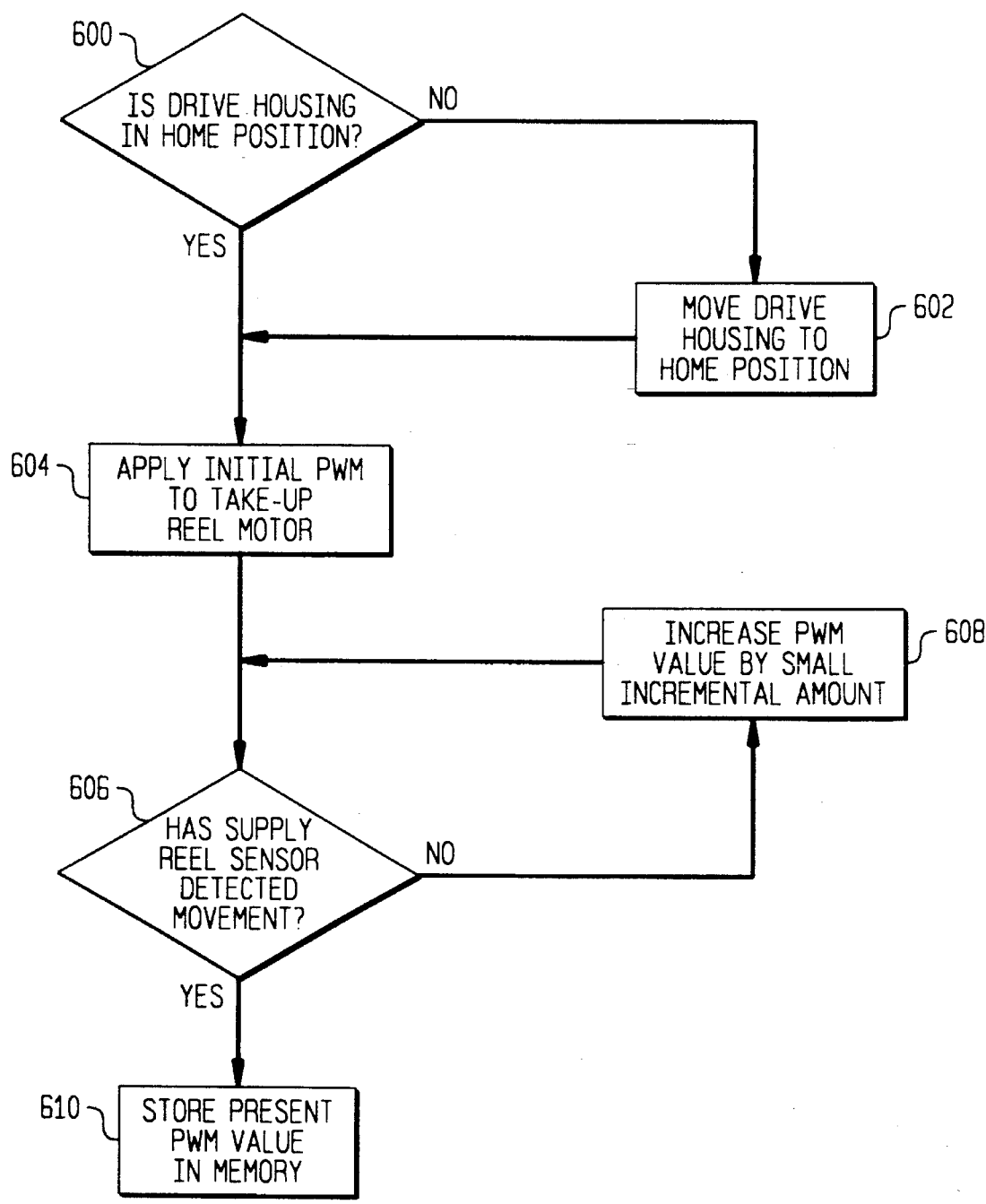
FIG. 6 is a flow diagram of an Initialization procedure in accordance with the present invention.

Referring to FIG. 6, the Initialization procedure to measure the $pwm_i$ is as follows. To run the Initialization procedure it is critical that nothing be restricting the movement of the thermal ribbon TR. Therefore, at decision block 600 the microcontroller 53 checks to ensure that the drive housing 103 is in the home position by interrogating sensor 73. This ensures that the print roller 107 is not in contact with the thermal ribbon TR. If sensor 73 indicates that the drive housing 103 is not in the home position, then at logic block 602 the microcontroller 53 instructs the crank motor 67 to rotate the drive housing 103 to the home position and then proceed next to logic block 604. If the drive housing 103 is already in the home position, then the procedure moves from decision block 600 directly to logic block 604. At logic block 604 the take-up reel motor 68 is enabled with an initial PWM $pwm_o$ which produces a very small torque and light tension on the thermal ribbon TR. It is important that $pwm_o$ is selected to be sufficiently small so that it is not capable of moving the thermal ribbon TR under normal conditions. Next at decision block 606, the microcontroller 53 determines if sensor 69 has detected movement of the supply reel 401. The microcontroller 53 determines that movement of the supply reel 401 has occurred if the status of the sensor 69 has changed. This change of status of sensor 69 is referred to as a sensor transition. Thus if the sensor 69 goes from blocked to unblocked or from unblocked to blocked, then movement has occurred. If at decision block 606 no movement has occurred, then the procedure moves to logic block 608 where the PWM is increased by an incremental amount before returning back to decision block 606. Those skilled in the art will appreciate that it is important to select the value of the incremental increase depending on the resolution with which $pwm_i$ is to be determined. On the other hand, if at decision block 606 movement is detected, then the procedure moves to logic block 610 where the current PWM is stored in memory 54 as $pwm_i$. It should now be apparent $pwm_i$ does not require any angular rotation or angular velocity measurements or calculations. Also, $pwm_i$ is not time dependent.

Thus $pwm_i$ compensates for differences, changes, and/or variances in the operational characteristics of the system, such as: friction, inertia, variability in the PWM-to-torque relationship of the motor, manufacturing tolerances, ambient environmental conditions and other factors unique to each particular printer and cassette. The practical effect of this procedure is to normalize the thermal meter 11 population by bringing each meter 11 up to the same baseline. Then the second component of pwm, $pwm_j$ can be used to provide a consistent tension across the thermal meter 11 population.

It is important to note that sensor 69 is not positioned so as to detect movement of the take-up reel 402. This arrangement would yield a mistakenly low value for $pwm_i$ because the take-up reel 402 may move without the supply reel 401 moving if there is slack in the thermal ribbon TR. If there is slack in the thermal ribbon TR, then the take-up reel 402 will rotate while the supply reel 401 remains stationary. Until all the slack is taken up there is little resistance on the take-up reel 402. Once all the slack is taken up, the drag spring inhibits rotation of the supply reel 401 until the PWM reaches sufficient magnetude to overcome the drag spring. Therefore, placing the sensor 69 to observe the supply reel 401 ensures that accurate results are obtained.

Generally, the Initialization procedure is run as part of the system powerup and during the ribbon cassette 21 replacement process. Subsequently, the microcontroller 53 can be programmed to run the Initialization procedure again after a predetermined number of print cycles have been executed or after some other desirable triggering event or condition.

The other component of pwm is $pwm_j$. To determine $pwm_j$ it is necessary to determine the radius of the take-up reel $r_t$. This is accomplished by calculating the radius of the supply reel $r_s$. Then an approximate value for $r_t$ can be inferred from the radius of the supply reel $r_s$. Finally, by relating $r_t$ and a selected thermal ribbon tension T to the PWM-to-torque characteristics of motor 68, the $pwm_j$ can be determined.

The radius of the supply reel $r_s$ can be calculated according to the following equation:

$$L = r_s q_s \quad (2)$$

where L is a linear length of thermal ribbon TR fed from the supply reel 401 and $q_s$ is a corresponding angular rotation of the supply reel 401. Another way to calculate L is by using its known relationship to the rotation of the print roller 107. To measure L the print roller 107 must be in the print position biased toward the thermal print head 19 with the thermal ribbon TR pinched in-between. The drive motor 65 is operatively connected to the print roller 107 to cause it to rotate. Because of compressive and frictional forces, when the print roller 107 rotates a corresponding amount of thermal ribbon TR is pulled from the supply reel 401. Therefore, assuming no slippage between the thermal ribbon TR and the print roller 107, L can also be determined from:

$$L = r_{pr} q_{pr} \quad (3)$$

where $r_{pr}$ is the radius of the print roller 107 and $q_{pr}$ is the angular rotation of the print roller 107. Combining equations (2) and (3) and then performing an algebraic manipulation yields:

$$r_s = r_{pr} q_{pr} / q_s \quad (4)$$

It should be apparent to those skilled in the art that any circular element, such as an encoding roller or capstan, positioned along the feed path of the thermal ribbon TR would serve as well as the print roller 107. Returning to equation (4), $q_{pr}$ has a known relationship to the angular rotation of drive motor 65. Each step that drive motor 65 executes results in a corresponding angular rotation of the drive motor output shaft depending on the specified number of steps per revolution in the drive motor 65. Also, drive motor 65 is coupled to print roller 107 by a series of interconnecting gears (not shown) of known relationship. As a result, one motor step creates a corresponding angular rotation of the print roller 107. Therefore, based on the above, the following equation is known:

$$q_{pr} = mK \quad (5)$$

where m is the number of motor steps of drive motor 65 and K is a constant that accounts for: (1) the specified number of steps per revolution in the drive motor 65, and (2) the gear ratios of the series of interconnecting gears. Substituting equation (5) into equation (4) yields:

$$r_s = r_{pr} mK / q_s \quad (6)$$

Additionally, $q_s$ has a known relationship to the gaps 83 and flags 81 of the supply reel 401. Each flag/gap pair subtends a known number of degrees of rotation b. As a result, $q_s$ can be determined by observing the supply reel sensor 69. Therefore, as the sensor 69 alternates between blocked and unblocked status the angular rotation $q_s$ of the supply reel 401 can be estimated. Accordingly, two consecutive sensor transitions represent b degrees of rotation of the supply reel 401. Therefore, if the drive motor 65 only executed the number of steps necessary to cause consecutive sensor transitions (a flap/gap pair), then b can be substituted for $q_s$ and equation (6) would simplify to:

$$r_s = r_{pr} mK / b \quad (7)$$

It should now be apparent that $r_{pr}$, b and K are all constants while m is an integer number easily counted while the drive motor 65 is in operation. Thus, $r_s$ may be readily calculated from equation (7).

Figure 4B:
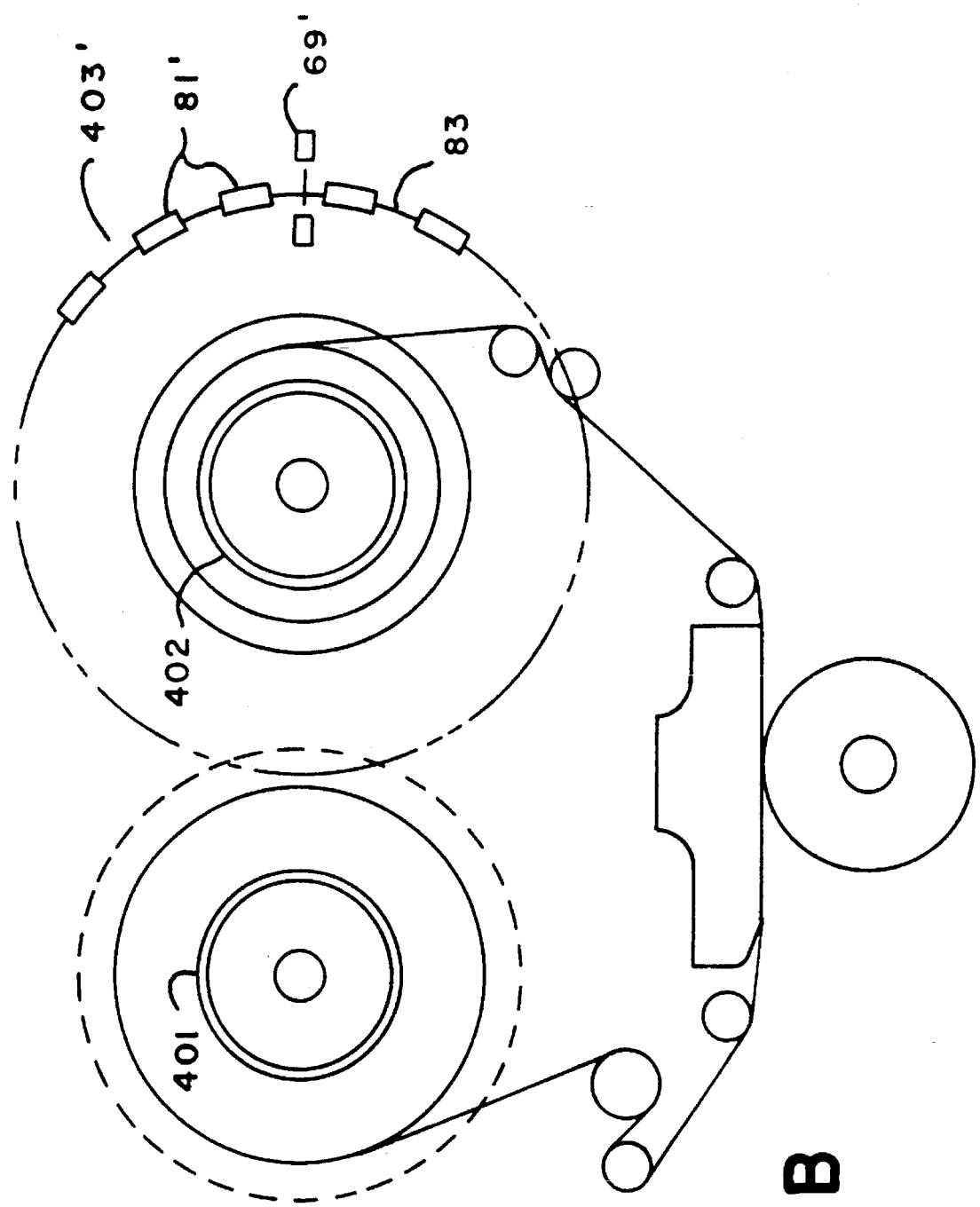
FIG. 4B is a schematic of a thermal ribbon system including a sensor assembly associated with a take-up reel and print system in accordance with the present invention.

Those skilled in the art will now recognize that sensor 69 is being utilized by both the Initialization procedure and the Jog Profile procedure. In the Jog Profile procedure sensor 69 could be located by either the supply reel 401 or the take-up reel 402. Referring to FIG. 4B, the sensor 69' is shown located adjacent to the rim 403' of the take-up reel 402. The rim 403' includes a plurality of flags 81' and gaps 83'. This structure is equivalent to that utilized for the supply reel 401. However, the Initialization procedure requires that sensor 69 be located by the supply reel 401 for the reasons discussed above. Therefore, sensor 69 is located by the supply reel 401. In this way, overall part count as well as cost is reduced.

Those skilled in the art will also now recognize that the determination of $r_s$ is in no way dependent on time. Factors such as: (1) time period between motor steps, (2) time period between sensor transitions, (3) angular velocity of the print roller 107, and (4) acceleration/deceleration of the print roller 107, as well as others, do not influence equation (7). Therefore, $r_s$ is calculated independent of all time consideration.

With the radius of the supply reel $r_s$ now determined, the radius of the take-up reel $r_t$ can be obtained from a radius conversion look-up table stored in memory 54. As long as the thermal ribbon does not break, what is unwound from the supply reel 401 is collected on the take-up reel 402. Therefore, the relationship of $r_t$ for a given $r_s$ is known. Factors such as: (1) the thermal ribbon TR is not perfectly smooth after printing because of wrinkling due to heat from the thermal print head 19 and bumps created by tiny pools of ink left on the thermal ribbon TR, and (2) the nonlinear relationship of the change in supply reel radius $r_s$ versus the change in take-up reel radius $r_t$ over the life of a ribbon cassette 21 can be incorporated into the look-up table.

With $r_t$ now known, the necessary torque t applied to the take-up reel 402 is calculated from:

$$t = T r_t \quad (8)$$

where T is the selected ribbon tension. From equation (8) the necessary take-up reel torque t can be readily calculated. Once t has been calculated, $pwm_j$ can be obtained. Since t is directly related to the known PWM-to-torque of the take-up reel motor 68 and the gear ratios of the series of interconnecting gears, the correlation between a specific t and corresponding $pwm_j$ is provided in a torque/PWM look-up table.

It should be apparent to those skilled in the art that once $r_s$ is calculated this information can be used for more than merely determining $pwm_j$. For example, if $r_s$ is close to $r_{smax}$, then the supply reel contains a plentiful supply of thermal ribbon TR. If, however, $r_s$ is close to $r_{hub}$, then the supply reel 401 only contains a short supply of thermal ribbon TR. This condition creates an undesirable condition that there may not be enough thermal ribbon TR remaining on the supply reel 401 to print an indicia. In such an instance, the operator will experience a loss of postage. To prevent this from occurring, the microcontroller 53 compares the value of $r_s$ to a threshold radius. If $r_s$ is above the threshold radius then the meter 11 is allowed to continue with a print cycle. On the other hand, if $r_s$ falls below the threshold radius then the microcontroller 53 disables printing and instructs the operator to install a new cassette 21 containing a fresh supply of thermal ribbon TR. In this manner, postal funds are not wasted.

Figure 7:
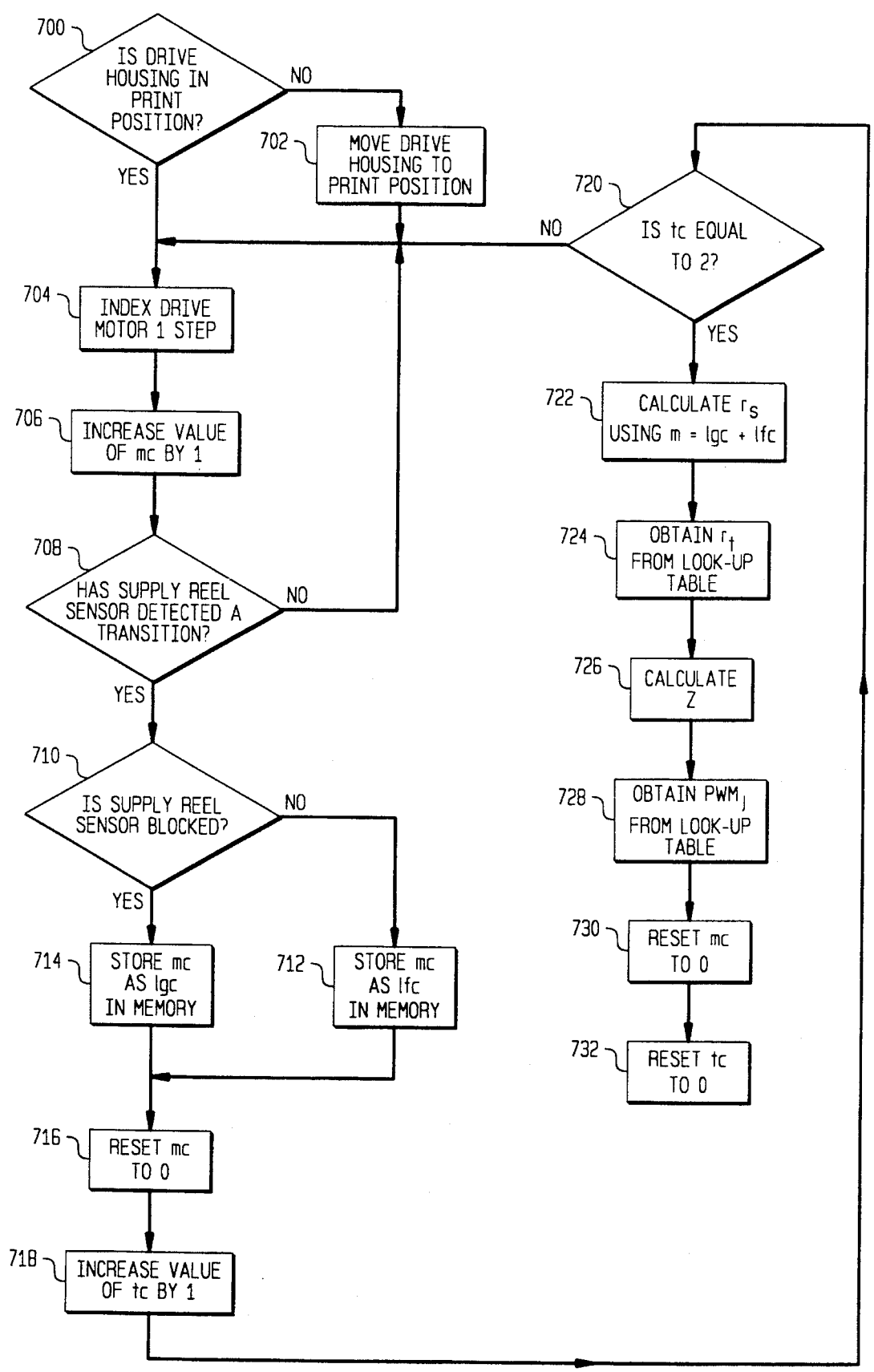
FIG. 7 is a flow diagram of a Jog Profile procedure in accordance with the present invention.

Referring to FIG. 7, the Jog Profile procedure, based on the above analysis, is as follows. At decision block 700 the microcontroller 53 interrogates home position sensor 73 to determine if the drive housing 103 is in the home position. If yes, then the procedure moves to logic block 704. If no, then the procedure moves to logic block 702 where the microcontroller 53 instructs the crank assembly 201 to reposition the drive housing 103 to the print position before proceeding with logic block 704. At logic block 704 the drive motor is instructed to index one motor step. Next, the value of a variable mc is increased by one. The variable mc is a number that keeps a running count of the motor steps executed by drive motor 65. Next, at decision block 708 a determination is made as to whether a sensor transition has occurred. If not, then the procedure returns to logic block 704. If yes, then the procedure moves to decision block 710 where the current status of the supply reel sensor 69 is checked. It is important to note that by using the sensor 69 for both the Initialization procedure and the Jog Profile procedure part count and costs are reduced. If the sensor 69 is not blocked, then the procedure moves to logic block 712 where the current value of mc is stored in memory as lfc before advancing to logic block 716. If the sensor 69 is blocked, then the procedure moves to logic block 714 where the current value of mc is stored in memory as lgc before advancing to logic block 716. The variables lfc and lgc are thus equal to the number of drive motor 65 steps occurring during the most recent flag (blocked period) and the most recent gap (unblocked period), respectively. At logic block 716, mc is reset to zero. Next, at logic block 718 a variable tc is increased by one. The variable tc corresponds to the number of sensor transitions that have been detected. Next, at decision block 720 tc is checked to see if it equals three. If no, then the procedure returns to logic block 704. If yes, then the procedure moves to logic block 722 where $r_s$ is calculated using equation (7) with m equal to lfc plus lgc. Next, at logic block 724 the corresponding $r_t$ is obtained from the radius conversion look-up. Next, at logic block 726, t is calculated using $r_t$ and T. Then, at logic block 728 the corresponding $pwm_j$ is obtained from the torque/PWM conversion look-up table. Next, at logic block 730, mc is reset to zero and then at logic block 732, tc is reset to zero.

It should now be apparent that time is not a factor in determining $pwm_j$. The necessary sensor transitions may occur within any time period and at any speed. Therefore, changes in printing speed do not influence the Jog Profile procedure.

The $pwm_j$ can also be determined during a print cycle or any other operation where the sheet material is advanced. Because the radius of the take-up reel 402 changes rather slowly, it is not necessary to recalculate $pwm_j$ after each print cycle or operation. However, doing so has the advantage of quickly compensating for a change in the ribbon cassette 21.

It should now be apparent that the final applied pulse width modulated voltage pwm may be obtained using equation (1). Thus, pwm is used for the next print cycle. Also, those skilled in the art will recognize that pwm has been obtained without involving in any way the time associated with the drive motor 65 steps or the time associated with the angular rotation of the supply reel 401 and take-up reel 402. Thus, there is no need for expensive sensors, encoders or accelerometers. In fact, the present invention realizes substantial economic benefits over the prior art by providing a simplified system for determining $r_s$. Additionally, the present invention performs equally well under constant velocity printing or variable velocity printing since rotational velocity is not a factor in the calculations.

Many features of the preferred embodiment represent design choices selected to best exploit the inventive concept for as implemented in the thermal postage meter 11. Moreover, additional advantages and modifications will readily occur to those skilled in the art. Therefore, the invention in its broader aspects is not limited to the specific details of the preferred embodiment. Accordingly, various modifications may be made without departing from the spirit of the general inventive concept as defined by the appended claims and their equivalents.

What is claimed is:

1. An apparatus for applying a desired tension on a thermal ribbon in a thermal postage meter, comprising:

a supply reel;

a take-up reel, the thermal ribbon unwound from said supply reel and fed along a defined path before being collected on said take-up reel;

a motor operatively connected to said take-up reel for applying torque to said take-up reel;

an optical sensor positioned to detect rotation of said supply reel;

a microcontroller for enabling said motor with an initial PWM to create an initial torque on said take-up reel and then for incrementally increasing said initial PWM; and a memory for storing a PWM corresponding to when said optical sensor detects rotation of said supply reel;

wherein said corresponding PWM is subsequently used by said apparatus to determine said desired tension on the thermal ribbon.

2. An apparatus for applying a desired tension on a sheet material, comprising:

a supply reel;

a take-up reel, the sheet material unwound from said supply reel and fed along a defined path before being collected on said take-up reel;

first means in driving communication with said take-up reel for applying torque to said take-up reel;

second means for indicating if the sheet material has moved;

a controller in electronic communication with said first means for causing said first means to apply an initial torque to said take-up reel and then capable of incrementally increasing said initial torque; and memory means for storing a parameter indicative of a torque corresponding to when said detecting means indicates that the sheet material has moved;

wherein said parameter is subsequently used by said apparatus to determine said desired tension on the sheet material.

3. The apparatus of claim 1 wherein said torque applying means is a motor operatively connected to said take-up reel.

4. The apparatus of claim 3 wherein said controller enables said motor with an initial PWM to create said initial torque on said take-up reel and said parameter is a PWM corresponding to when movement of the sheet material occurs.

5. The apparatus of claim 4 wherein the sheet material is a thermal ribbon.

6. The apparatus of claim 5 wherein said detecting means is an optical sensor positioned to detect rotation of said supply reel.

7. The apparatus of claim 6 wherein said apparatus is part of a thermal printer.

8. The apparatus of claim 7 wherein said thermal printer is a thermal printing postage meter.

9. A method of determining a desired tension on a sheet material in a transport system, the sheet material unwound from a supply reel and fed along a defined path before being collected on a take-up reel, said method comprising the steps of:

(a) applying an initial torque to the take-up reel;

(b) increasing said initial torque by an incremental amount;

(c) storing a parameter associated with a torque corresponding to when a first means indicates that the sheet material has moved; and (d) determining said desired tension on the sheet material using said parameter.

10. The method of claim 9 wherein said torque is applied to said take-up reel by a motor operatively connected to said take-up reel.

11. The method of claim 10 wherein said parameter is a PWM applied to a motor that corresponds to when movement of the sheet material occurs.

12. The method of claim 11 wherein the sheet material, said supply reel and said take-up reel are housed in a cassette.

13. The method of claim 12, further comprising the step of:

(e) repeating steps (a) through (d) when said cassette is replaced.

14. The method of claim 13 wherein said first means is an optical sensor.

15. The method of claim 11 wherein said system is part of a thermal printing postage meter.

16. An apparatus for applying a desired tension on a sheet material, comprising:

a supply reel;

a take-up reel, the sheet material unwound from said supply reel and fed along a defined path before being collected on said take-up reel;

first means in driving communication with said take-up reel for applying torque to said take-up reel;

second means for indicating if the sheet material has moved;

a controller in electronic communication with said first means for causing said first means to apply an initial torque to said take-up reel and then for incrementally increasing said initial torque;

memory means for storing a parameter indicative of a torque corresponding to when said first means indicates that the sheet material has moved;

a circular element having a known radius disposed along said defined path of the sheet material so that rotation of said circular element and feeding of the sheet material occurs in a known relationship;

a first motor operatively connected to said circular element for rotating said circular element in discrete motor steps, each of said discrete motor steps corresponding to a known angular rotation of said circular element;

third means for indicating when said take-up reel has rotated through a predetermined angle;

fourth means for counting a number of said discrete motor steps corresponding to said take-up reel rotating through said predetermined angle; and fifth means for computing the radius of said take-up reel from said radius of said circular element multiplied by said number of said discrete motor steps and divided by said predetermined angle;

said radius of said take-up reel and said parameter subsequently used by said apparatus to determine said desired tension on the sheet material.

17. The apparatus of claim 16 wherein said first means is a second motor operatively connected to said take-up reel.

18. The apparatus of claim 17 wherein said controller enables said second motor with an initial PWM to create said torque on said take-up reel and said parameter is a PWM corresponding to when movement of the sheet material occurs.

19. The apparatus of claim 18 wherein the sheet material is a thermal ribbon.

20. The apparatus of claim 19 wherein said second means is a first optical sensor positioned to detect rotation of said supply reel.

21. The apparatus of claim 20 wherein said circular element is a print roller.

22. The apparatus of claim 21 wherein said third means is a second optical sensor.

23. The apparatus of claim 22 wherein said apparatus is part of a thermal printer.

24. The apparatus of claim 23 wherein said thermal printer is a thermal printing postage meter.

25. A method of determining a desired tension on a sheet material in a transport system, the sheet material unwound from a supply reel and fed along a defined path before being collected on a take-up reel, said system having a circular element of known radius disposed along said defined path to rotate in a known relationship relative to movement of the sheet material, said method comprising the steps of:

(a) applying an initial torque to the take-up reel;

(b) increasing said initial torque by an incremental amount;

(c) storing a parameter associated with a torque corresponding to when a first means indicates that the sheet material has moved;

(d) rotating the circular element in discrete steps;

(e) counting a number of said discrete steps necessary to rotate the take-up reel through a predetermined angle;

(f) computing the radius of the take-up reel from the radius of the circular element multiplied by said number of said discrete steps and divided by said predetermined angle; and (g) determining said desired tension on sheet material using the radius of the take-up reel and said parameter.

26. The method of claim 25 wherein said torque is applied to said take-up reel by a motor operatively connected to said take-up reel.

27. The method of claim 26 wherein said parameter is a PWM applied to a motor that corresponds to when movement of the sheet material occurs.

28. The method of claim 27 wherein the circular element is a print roller.

29. The method of claim 28 wherein said first means is an optical sensor.

30. The method of claim 29 wherein said system is part of a thermal printer.

31. The method of claim 30 wherein said thermal printer is a thermal printing postage meter.

32. The method of claim 31 wherein steps (d) through (f) are performed during a print cycle.

33. An apparatus for applying a desired tension on a sheet material, comprising:

a supply reel;

a take-up reel, the sheet material unwound from said supply reel and fed along a defined path before being collected on said take-up reel;

a circular element having a known radius disposed along said defined path of the sheet material so that rotation of said circular element and feeding of the sheet material occurs in a known relationship;

a motor operatively connected to said circular element for rotating said circular element in discrete motor steps, each of said discrete motor steps corresponding to a known angular rotation of said circular element;

first means for indicating when said take-up reel has rotated through a predetermined angle;

second means for counting a number of said discrete motor steps corresponding to said take-up reel rotating through said predetermined angle; and third means for computing the radius of said take-up reel from said radius of said circular element multiplied by said number of said discrete motor steps and divided by said predetermined angle;

said radius of said take-up reel subsequently used by said apparatus to determine said desired tension on the sheet material.

34. The apparatus of claim 33 wherein said circular element is a print roller.

35. The apparatus of claim 34 wherein said first means is an optical sensor.

36. The apparatus of claim 35 wherein said apparatus is part of a thermal printer.

37. The apparatus of claim 36 wherein said thermal printer is a thermal printing postage meter.

38. A method of determining a desired tension on a sheet material in a transport system, the sheet material unwound from a supply reel and fed along a defined path before being collected on a take-up reel, said system having a circular element of known radius disposed along said defined path to rotate in a known relationship relative to movement of the sheet material, said method comprising the steps of:

(a) rotating the circular element in discrete steps;

(b) counting a number of said discrete steps necessary to rotate the take-up reel through a predetermined angle;

(c) computing the radius of the take-up reel from the radius of the circular element multiplied by said number of said discrete steps and divided by said predetermined angle; and (d) determining the desired tension on the sheet material using the radius of the take-up reel.

39. The method of claim 38 wherein the circular element is a print roller.

40. The method of claim 39 wherein the sheet material is a thermal ribbon.

41. The method of claim 40 wherein said system is part of a thermal printer.

42. The method of claim 41 wherein said thermal printer is a thermal printing postage meter.

43. The method of claim 42 wherein steps (a) through (d) are performed during a print cycle.

44. An apparatus for applying a desired tension on a sheet material, comprising:

a supply reel;

a take-up reel, the sheet material unwound from said supply reel and fed along a defined path before being collected on said take-up reel;

a circular element having a known radius disposed along said defined path of the sheet material so that rotation of said circular element and feeding of the sheet material occurs in a known relationship;

a motor operatively connected to said circular element for rotating said circular element in discrete motor steps, each of said discrete motor steps corresponding to a known angular rotation of said circular element;

first means for indicating when said supply reel has rotated through a predetermined angle;

second means for counting a number of said discrete motor steps corresponding to said supply reel rotating through said predetermined angle; and third means for computing the radius of said supply reel from said radius of said circular element multiplied by said number of said discrete motor steps and divided by said predetermined angle;

said radius of said supply reel subsequently used by said apparatus to determine said desired tension on sheet material.

45. The apparatus of claim 44 wherein said circular element is a print roller.

46. The apparatus of claim 45 wherein said first means is an optical sensor.

47. The apparatus of claim 46 wherein said apparatus is part of a thermal printer.

48. The apparatus of claim 47 wherein said thermal printer is a thermal printing postage meter.

49. A method of determining a desired tension on a sheet material in a transport system, the sheet material unwound from a supply reel and fed along a defined path before being collected on a take-up reel, said system having a circular element of known radius disposed along said defined path to rotate in a known relationship relative to movement of the sheet material, said method comprising the steps of:

(a) rotating the circular element in discrete steps;

(b) counting a number of said discrete steps necessary to rotate the supply reel through a predetermined angle;

(c) computing the radius of the supply reel from the radius of the circular element multiplied by said number of said discrete steps and divided by said predetermined angle; and (d) determining the desired tension on the sheet material using the radius of the supply reel.

50. The method of claim 49 wherein the circular element is a print roller.

51. The method of claim 50 wherein the sheet material is a thermal ribbon.

52. The method of claim 51 wherein said system is part of a thermal printer.

53. The method of claim 52 wherein said thermal printer is a thermal printing postage meter.

54. The method of claim 53 wherein steps (a) through (d) are performed during a print cycle.

55. In a transport system including a sheet material, an apparatus for computing the radius of a supply reel, the sheet material unwound from the supply reel and fed along a defined path to a workstation, comprising:

a circular element having a known radius disposed along said defined path of the sheet material so that rotation of said circular element and feeding of the sheet material occurs in a known relationship;

a motor operatively connected to said circular element for rotating said circular element in discrete motor steps, each of said discrete motor steps corresponding to a known angular rotation of said circular element;

first means for indicating when the supply reel has rotated through a predetermined angle;

second means for counting a number of said discrete motor steps corresponding to the supply reel rotating through said predetermined angle; and third means for computing the radius of the supply reel from said radius of said circular element multiplied by said number of said discrete motor steps and divided by said predetermined angle.

56. The apparatus of claim 55 wherein said circular element is a print roller.

57. The apparatus of claim 56 wherein said first means is an optical sensor.

58. The apparatus of claim 57 wherein said apparatus is part of a thermal printer.

59. The apparatus of claim 58 wherein said thermal printer is a thermal printing postage meter.

60. A method of computing the radius of a supply reel in a sheet material transport system, the sheet material unwound from a supply reel and fed along a defined path to a workstation, said system having a circular element of known radius disposed along said defined path to rotate in a known relationship relative to movement of the sheet material, said method comprising the steps of:

(a) rotating the circular element in discrete steps;

(b) counting a number of said discrete steps necessary to rotate the supply reel through a predetermined angle; and (c) computing the radius of the supply reel from the radius of the circular element multiplied by said number of said discrete steps and divided by said predetermined angle.

61. The method of claim 60 wherein the circular element is a print roller.

62. The method of claim 61 wherein the sheet material is a thermal ribbon.

63. The method of claim 62 wherein said system is part of a thermal printer.

64. The method of claim 63 wherein said thermal printer is a thermal printing postage meter.

65. The method of claim 64 wherein steps (a) through (d) are performed during a print cycle.

66. An apparatus for disabling a printer, said printer including a transport system having a supply reel and a sheet material, the sheet material unwound from the supply reel and fed along a defined path to a workstation, comprising:

a circular element having a known radius disposed along said defined path of the sheet material so that rotation of said circular element and feeding of the sheet material occurs in a known relationship;

a motor operatively connected to said circular element for rotating said circular element in discrete motor steps, each of said discrete motor steps corresponding to a known angular rotation of said circular element;

first means for indicating when the supply reel has rotated through a predetermined angle;

second means for counting a number of said discrete motor steps corresponding to the supply reel rotating through said predetermined angle;

a microcontroller for computing the radius of the supply reel from said radius of said circular element multiplied by said number of said discrete motor steps and divided by said predetermined angle; and a threshold radius stored in said microcontroller, said microcontroller being programmed to disable the printer if the radius of the supply reel is less than said threshold radius.

67. A method of disabling a printer, said printer including a transport system having a supply reel and a sheet material, the sheet material unwound from said supply reel and fed along a defined path to a workstation, said printer also having a circular element of known radius disposed along said defined path to rotate in a known relationship relative to movement of the sheet material, said method comprising the steps of:

(a) rotating the circular element in discrete steps;

(b) counting a number of said discrete steps necessary to rotate the supply reel through a predetermined angle;

(c) computing the radius of the supply reel from the radius of the circular element multiplied by said number of said discrete steps and divided by said predetermined angle;

(d) comparing the radius of the supply reel to a threshold radius; and (e) disabling said printer if said radius of said supply reel is less than said threshold radius.

\* \* \* \* \*